US009261760B2

(12) United States Patent
Wu et al.

(10) Patent No.: US 9,261,760 B2
(45) Date of Patent: Feb. 16, 2016

(54) PROJECTION APPARATUS HAVING ILLUMINATION SYSTEM AND ASSOCIATED ION FAN

(71) Applicants: Shang-Hsuang Wu, Hsin-Chu (TW); Jhih-Hao Chen, Hsin-Chu (TW); Tsung-Ching Lin, Hsin-Chu (TW); Wen-Yen Chung, Hsin-Chu (TW)

(72) Inventors: Shang-Hsuang Wu, Hsin-Chu (TW); Jhih-Hao Chen, Hsin-Chu (TW); Tsung-Ching Lin, Hsin-Chu (TW); Wen-Yen Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 89 days.

(21) Appl. No.: 13/861,405

(22) Filed: Apr. 12, 2013

(65) Prior Publication Data

US 2014/0085612 A1 Mar. 27, 2014

(30) Foreign Application Priority Data

Sep. 27, 2012 (CN) .......................... 2012 1 0369975

(51) Int. Cl.
*G03B 21/16* (2006.01)
*F21V 29/02* (2006.01)
(Continued)

(52) U.S. Cl.
CPC .............. *G03B 21/16* (2013.01); *F21V 29/002* (2013.01); *F21V 29/02* (2013.01); *G03B 21/20* (2013.01);
(Continued)

(58) Field of Classification Search
CPC ........ G03B 21/00; G03B 21/14; G03B 21/16; G03B 21/20; G03B 21/2013; G03B 21/2033; H04N 9/31; H04N 9/3141; H04N 9/3144; H04N 9/3164; H04N 9/3173; F21V 29/00; F21V 29/002; F21V 29/006; F21V 29/02; F21V 29/025; F21V 29/027; F21V 29/20; F21V 29/22; F21V 29/40; F21V 29/405
USPC .............. 353/52, 57–58, 60–61, 94; 362/218, 362/230–231, 264, 294, 345, 373, 580
See application file for complete search history.

(56) References Cited

U.S. PATENT DOCUMENTS 5,170,194 A * 12/1992 Kurematsu et al. ............. 353/52
7,210,790 B2 * 5/2007 Ishii et al. ....................... 353/61
(Continued)

FOREIGN PATENT DOCUMENTS

| CN | 1667496 | 9/2005 |
|---|---|---|
| CN | 100437343 | 11/2008 |
| CN | 101725932 | 6/2010 |

OTHER PUBLICATIONS

AAXA Technologies, "P2 Pico Projector", sale date: Apr. 12, 2010, http://www.aaxatech.com/products/p2_pico_projector.htm.*
(Continued)

*Primary Examiner* — Toan Ton
*Assistant Examiner* — Magda Cruz
(74) *Attorney, Agent, or Firm* — Jianq Chyun IP Office

(57) ABSTRACT

An illumination system disposed in a projection apparatus includes a solid-state light source group, a cooling module, and an ion fan. The cooling module is thermally coupled to the solid-state light source group. The cooling module is located on a path of a forced convection air generated by the ion fan. The projection apparatus avails prolonging a life time of the illumination system, and the ion fan does not have a magnetic shearing sound of a motor and a wind shearing sound of fan blades to avail reducing an operation noise of the illumination system.

7 Claims, 3 Drawing Sheets

(51) Int. Cl.
 *G03B 21/20* (2006.01)
 *H04N 9/31* (2006.01)
 *F21V 29/00* (2015.01)

(52) U.S. Cl.
 CPC ........ *G03B 21/2013* (2013.01); *G03B 21/2033* (2013.01); *H04N 9/31* (2013.01); *H04N 9/3141* (2013.01); *H04N 9/3144* (2013.01); *H04N 9/3164* (2013.01); *H04N 9/3173* (2013.01)

(56) References Cited

U.S. PATENT DOCUMENTS

| | | | | |
|---|---|---|---|---|
| 7,325,931 | B2 * | 2/2008 | Ikeda et al. | 353/61 |
| 7,407,293 | B2 * | 8/2008 | Ishii et al. | 353/57 |
| 8,052,281 | B2 * | 11/2011 | Huang | 353/52 |
| 8,226,244 | B2 * | 7/2012 | Yamagishi et al. | 353/52 |
| 8,610,160 | B2 * | 12/2013 | Lee | 257/99 |
| 2005/0077103 | A1 * | 4/2005 | Ikeda et al. | 181/225 |
| 2005/0105061 | A1 * | 5/2005 | DeLong | 353/99 |
| 2005/0201107 | A1 * | 9/2005 | Seki | G03B 21/16 362/373 |
| 2005/0213048 | A1 * | 9/2005 | Ikeda et al. | 353/57 |
| 2005/0237500 | A1 * | 10/2005 | Ishii et al. | 353/122 |
| 2006/0017889 | A1 * | 1/2006 | Ishii et al. | 353/57 |
| 2007/0157627 | A1 * | 7/2007 | Hsu | 62/3.2 |
| 2007/0201232 | A1 * | 8/2007 | Chen | 362/294 |
| 2008/0117597 | A1 * | 5/2008 | Zhou et al. | 361/700 |
| 2011/0037367 | A1 * | 2/2011 | Wang et al. | 313/46 |
| 2011/0285267 | A1 * | 11/2011 | Lu et al. | 313/46 |
| 2012/0007742 | A1 | 1/2012 | Gooch et al. | |
| 2012/0057356 | A1 | 3/2012 | Hizer et al. | |

OTHER PUBLICATIONS

"Office Action of China Counterpart Application", issued on Feb. 27, 2015, p. 1-p. 8.
"Office Action of China Counterpart Application," issued on Oct. 9, 2015, p. 1-p. 6.

* cited by examiner

PROJECTION APPARATUS HAVING ILLUMINATION SYSTEM AND ASSOCIATED ION FAN

CROSS-REFERENCE TO RELATED APPLICATION

This application claims the priority benefit of China application serial no. 201210369975.2, filed on Sep. 27, 2012. The entirety of the above-mentioned patent application is hereby incorporated by reference herein and made a part of this specification.

BACKGROUND

1. Technical Field

The invention relates to an illumination system used in a projection apparatus and a projection apparatus using the illumination system.

2. Related Art

A projection apparatus is a display apparatus used for producing large size images. An imaging principle of the projection apparatus is to convert an illumination beam generated by a light source into an image beam through a light valve, and project the image beam onto a screen or a wall through a lens to form an image. Along with development of projection technology and reduction of fabrication cost, usage of the projection apparatus has gradually extended from commercial use to family use.

The conventional projection apparatus generally uses a high-pressure mercury lamp as a light source (for example, an ultrahigh-pressure gas discharge lamp), though a large amount of emitted heat thereof limits a life time of the high-pressure mercury lamp. Compared to the high-pressure mercury lamp, a solid-state light source (for example, a light-emitting diode (LED) or a laser diode (LD)) has a longer life time and occupies less space.

The projection apparatus generally uses a heat sink in collaboration with a motor fan to cool down the light source, which is adapted to both of the high-pressure mercury lamp and the solid-state light source. However, a problem of friction loss is generated between a shaft and a bearing of the motor fan. Usage of an oil-contained bearing may cause pollution, and a magnetic shearing sound caused by rotated motor fan and a wind shearing sound caused due to contact of rotated fan blades and air may all produce noise.

U.S. Patent Publication No. 20050077103, China Patent Publication No. 100437343 and U.S. Pat. No. 7,407,293 disclose a technique of cooling a "high-pressure mercury lamp" by using an ion wind generator to produce a forced convection air.

SUMMARY

Accordingly, the invention is directed to an illumination system, and the illumination system is used in a projection apparatus to provide a longer life time and lower operation noise.

The invention is directed to a projection apparatus, and an illumination system of the projection apparatus has a longer life time and lower operation noise.

Additional aspects and advantages of the invention will be set forth in the description of the techniques disclosed in the invention.

To achieve one of or all aforementioned and other advantages, an embodiment of the invention provides an illumination system adapted to be used in a projection apparatus. The illumination system includes a solid-state light source group, a cooling module, and an ion fan. The cooling module is thermally coupled to the solid-state light source group. The cooling module is located on a path of a forced convection air generated by the ion fan.

To achieve one of or all aforementioned and other advantages, an embodiment of the invention provides a projection apparatus. The projection apparatus includes a casing, an illumination system, a light valve, and a lens. The illumination system is disposed in the casing and is used to produce an illumination beam. The light valve is disposed in the casing and is used to convert the illumination beam into an image beam. The lens is disposed in the casing and is used to convert the image beam into a projection beam. The illumination system includes a solid-state light source group, a cooling module, and an ion fan. The cooling module is thermally coupled to the solid-state light source group. The cooling module is located on a path of a forced convection air generated by the ion fan.

According to the above descriptions, the embodiment of the invention has at least one of the following effects. In the embodiment of the invention, since the ion fan has no friction loss and oil pollution, it avails prolonging a life time of the illumination system, and the ion fan does not have a magnetic shearing sound of a motor and a wind shearing sound of fan blades, which avails reducing an operation noise of the illumination system. Moreover, the ion fan used in collaboration with the solid-state light source group may be used in a projection apparatus with a smaller height of casing.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
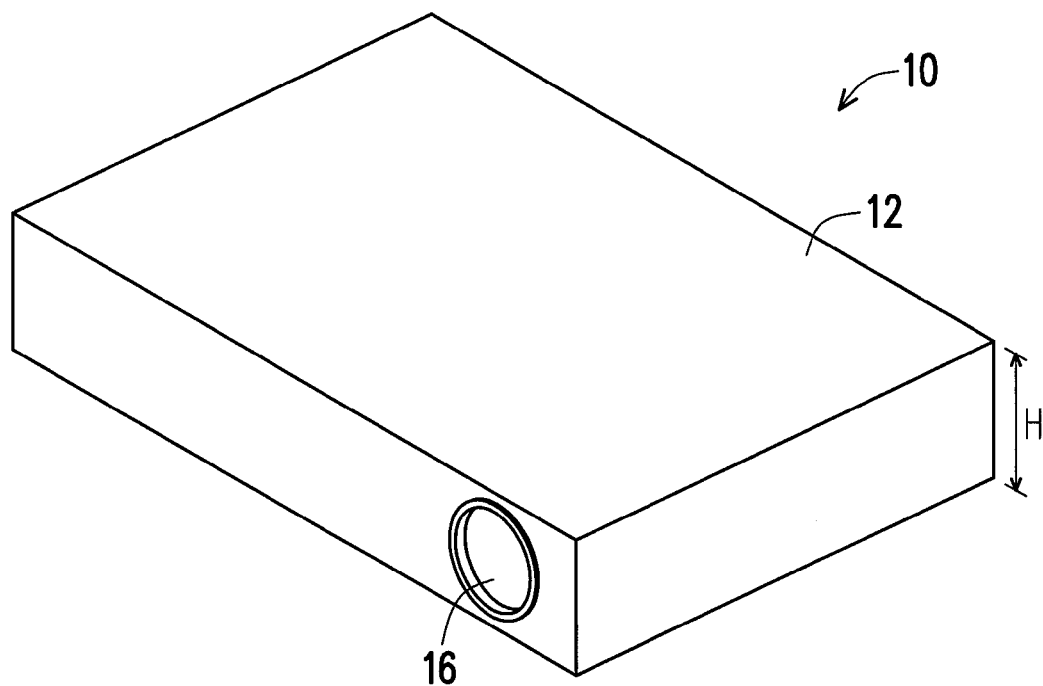
FIG. 1 is a three-dimensional view of a projection apparatus according to an embodiment of the invention.
Figure 2:
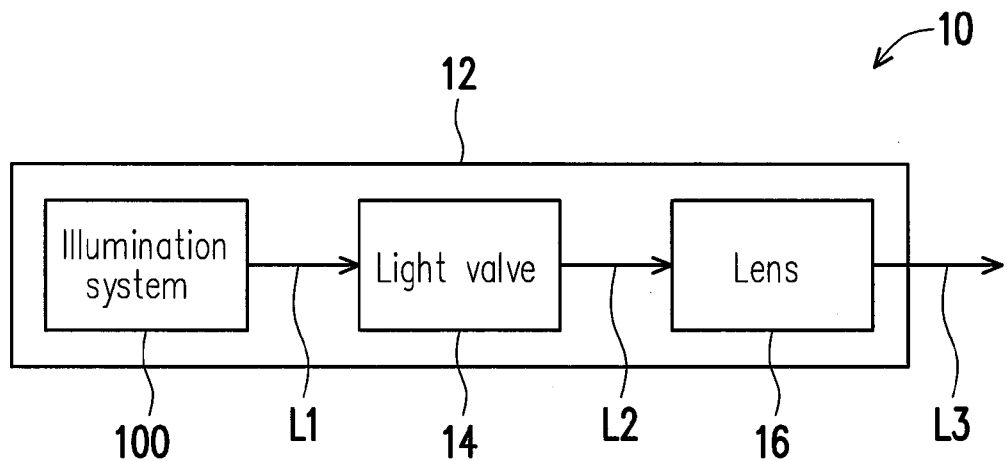
FIG. 2 is a schematic block diagram of the projection apparatus of FIG. 1.

Referring to FIG. 1 and FIG. 2, the projection apparatus 10 of the embodiment includes a casing 12, an illumination system 100, a light valve 14, and a lens 16. The illumination system 100, the light valve 14, and the lens 16 are all disposed in the casing 12. The illumination system 100 is used to produce an illumination beam L1. The light valve 14 is used to convert the illumination beam L1 into an image beam L2. The lens 16 is used to convert the image beam L2 into a projection beam L3, and projects the projection beam L3 onto a screen or a wall (not shown) to form a projected image. In the embodiment, as shown in FIG. 1, a maximum height H of the casing 12 is smaller than 5 centimeters.

Figure 3:
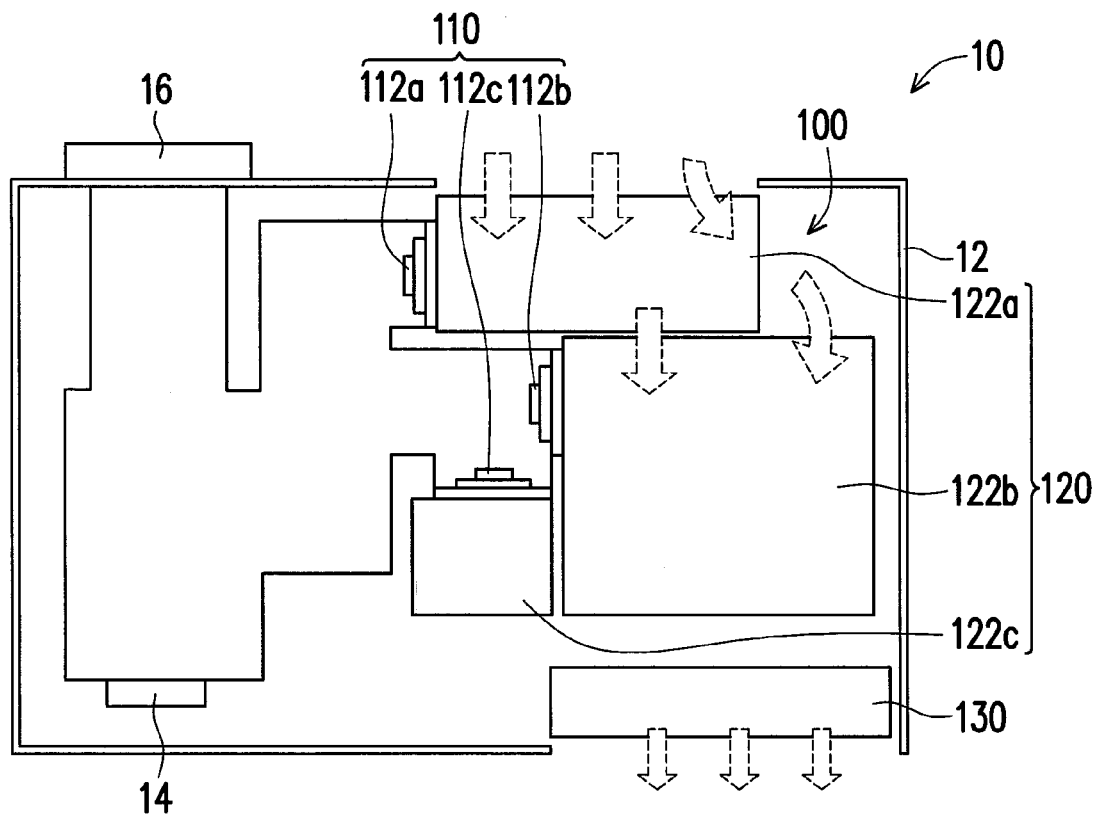
FIG. 3 is a component configuration diagram of the projection apparatus of FIG. 1.

Referring to FIG. 3, in the embodiment, the illumination system 100 includes a solid-state light source group 110, a cooling module 120, and an ion fan 130. The cooling module 120 is thermally coupled to the solid-state light source group 110. The ion fan 130 is used to generate a forced convection air, and the cooling module 120 is located on a path of the forced convection air generated by the ion fan 130.

In the embodiment, the solid-state light source group 110 includes a plurality of solid-state light-emitting elements 112a, 112b, and 112c, for example, light-emitting diodes (LEDs), laser diodes (LDs) or a combination thereof. The solid-state light-emitting elements 112a, 112b, and 112c respectively produce a red color light (R), a green color light (G), and a blue color light (B) to form the illumination beam L1. Moreover, the cooling module 120 includes a plurality of heat sinks 122a, 122b, and 122c, and the heat sinks 122a, 122b, and 122c are directly connected to the solid-state light-emitting elements 112a, 112b, and 112c, respectively. At least one of the heat sinks 122a, 122b, and 122c is located on the path of the forced convection air generated by the ion fan 130.

In the embodiment, the solid-state light-emitting element 112a is a red LED element. Compared to a green LED element and a blue LED element, a heat-resistant specification of the red LED element is the lowest. Therefore, the heat sink 122a thermally coupled to the solid-state light-emitting element 112a (i.e. the red LED element) is located at an upstream of the forced convection air generated by the ion fan 130 compared to the other heat sinks 122b and 122c, so as to achieve a better cooling effect. The so-called "upstream" is defined as a place closest to where an airflow flows into the casing 12 from the outside. Moreover, the heat sink 122b thermally coupled to the solid-state light-emitting element 112b (i.e. the green LED element) is located at a downstream of the forced convection air generated by the ion fan 130 compared to the heat sink 122a, i.e. the heat sink 122b is located behind the heat sink 122a to receive the airflow flowing through the heat sink 122a.

In the embodiment, the ion fan 130 ionizes air through a high voltage of thousands of volts, and attracts the ionized air to a place with another polarity, such that the air flows to form the forced convection air to cool down the cooling module 120. Compared to a conventional motor fan, the ion fan 130 has no friction loss and oil pollution, which avails prolonging a life time of the illumination system 100. Compared to a conventional motor fan, the ion fan 130 does not have a magnetic shearing sound of a motor and a wind shearing sound of fan blades, which avails reducing an operation noise of the illumination system 100.

The conventional motor fan must occupy a cylindrical space to facilitate the fan blades to rotate along a shaft to generate the forced convection air, but the ion fan 130 is not limited to the cylindrical space. Therefore, a forced convection air generation area of the ion fan 130 may be a rectangle (i.e. a profile of the ion fan 130 may be a rectangle), or may be designed to any required shape, so as to provide the maximum convection area within a limited space. Moreover, in another embodiment that is not illustrated, a plurality of ion fans may be used, and the ion fans may be connected in series or in parallel according to a design requirement. The number of the used ion fans is not limited by the invention.

Figure 4:
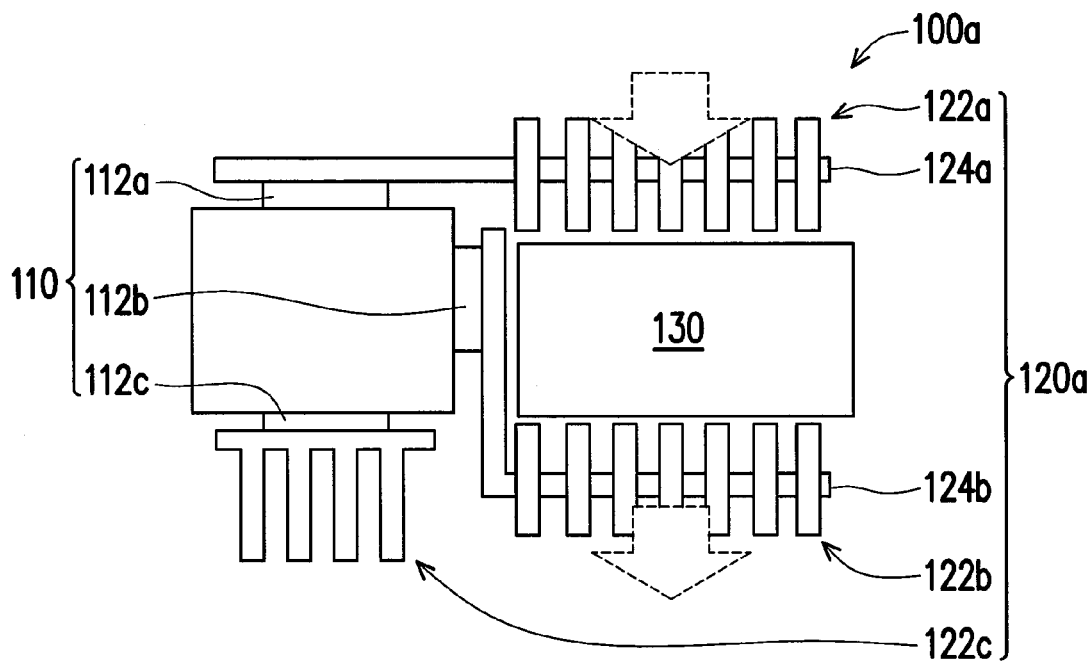
FIG. 4 is a component configuration diagram of an illumination system according to another embodiment of the invention.

Referring to FIG. 4, similar to the illumination system 100 of FIG. 3, the illumination system 100a of the embodiment also includes the solid-state light source group 110, a cooling module 120a, and the ion fan 130. The cooling module 120a is thermally coupled to the solid-state light source group 110. The ion fan 130 is used to generate a forced convection air, and the cooling module 120a is located on a path of the forced convection air generated by the ion fan 130.

Compared to the cooling module 120 of FIG. 3, the cooling module 120a of FIG. 4 further includes a plurality of heat pipes 124a and 124b. In the embodiment, the heat sink 122a may be thermally coupled to the solid-state light-emitting element 112a through the heat pipe 124a, and the heat sink 122b may be thermally coupled to the solid-state light-emitting element 112b through the other heat pipe 124b. The ion fan 130 is located between the heat sinks 122a and 122b.

In detail, the solid-state light-emitting element 112a is thermally coupled to a section of the heat pipe 124a, and another section of the heat pipe 124a is thermally coupled to the corresponding heat sink 122a. The heat sink 122a includes a plurality of cooling fins arranged in parallel, and the heat pipe 124a is thermally coupled to the cooling fins. Therefore, the heat generated during the operation of the solid-state light-emitting element 112a may be transferred to the heat sink 122a through the heat pipe 124a.

Similarly, the solid-state light-emitting element 112b is thermally coupled to a section of the heat pipe 124b, and another section of the heat pipe 124b is thermally coupled to the corresponding heat sink 122b. The heat sink 122b includes a plurality of cooling fins arranged in parallel, and the heat pipe 124b is thermally coupled to the cooling fins. Therefore, the heat generated during the operation of the solid-state light-emitting element 112b may be transferred to the heat sink 122b through the heat pipe 124b.

In the embodiment, the solid-state light-emitting element 112a is a red LED element, the solid-state light-emitting element 112b is a green LED element, and the solid-state light-emitting element 112c is a blue LED element. Since a heat-resistant specification of the red LED element is the lowest, the heat sink 122a thermally coupled to the solid-state light-emitting element 112a is located at the upstream of the forced convection air generated by the ion fan 130, so as to achieve a best cooling effect. Moreover, the heat sink 122b is located at the downstream of the forced convection air generated by the ion fan 130 compared to the heat sink 122a, so as to achieve a better cooling effect.

Figure 5:
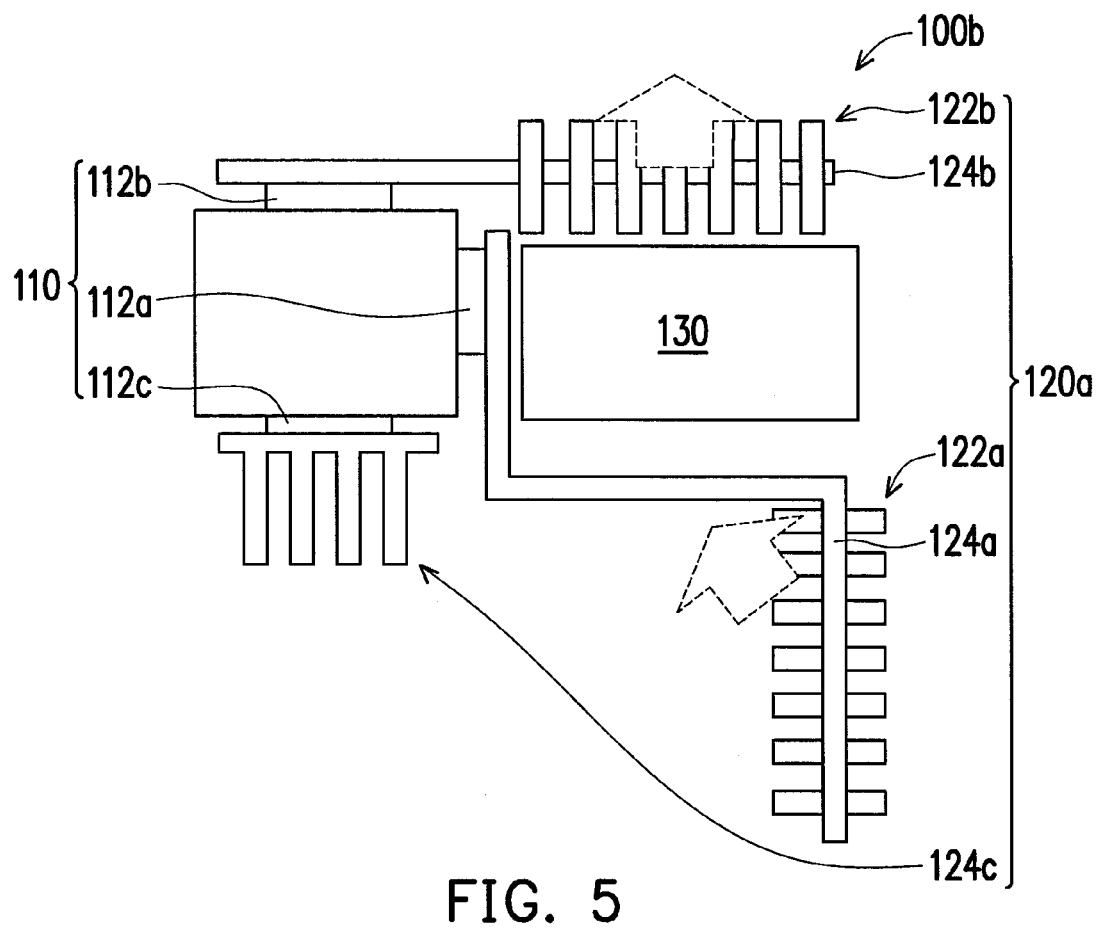
FIG. 5 is a component configuration diagram of an illumination system according to another embodiment of the invention.

Referring to FIG. 5, similar to the illumination system 100a of FIG. 4, positions of the solid-state light-emitting elements 112a and 112b of the illumination system 100b of the embodiment are exchanged. Positions of the heat sink 122a thermally coupled to the solid-state light-emitting element 112a and the heat sink 122b thermally coupled to the solid-state light-emitting element 112b are correspondingly adjusted. The ion fan 130 is also located between the heat sinks 122a and 122b.

Similarly, as that shown in FIG. 5, the heat sink 122a thermally coupled to the solid-state light-emitting element 112a is located at the upstream of the forced convection air generated by the ion fan 130, so as to achieve a best cooling effect. Moreover, the heat sink 122b is located at the downstream of the forced convection air generated by the ion fan 130 compared to the heat sink 122a, so as to achieve a better cooling effect.

Figure 6:
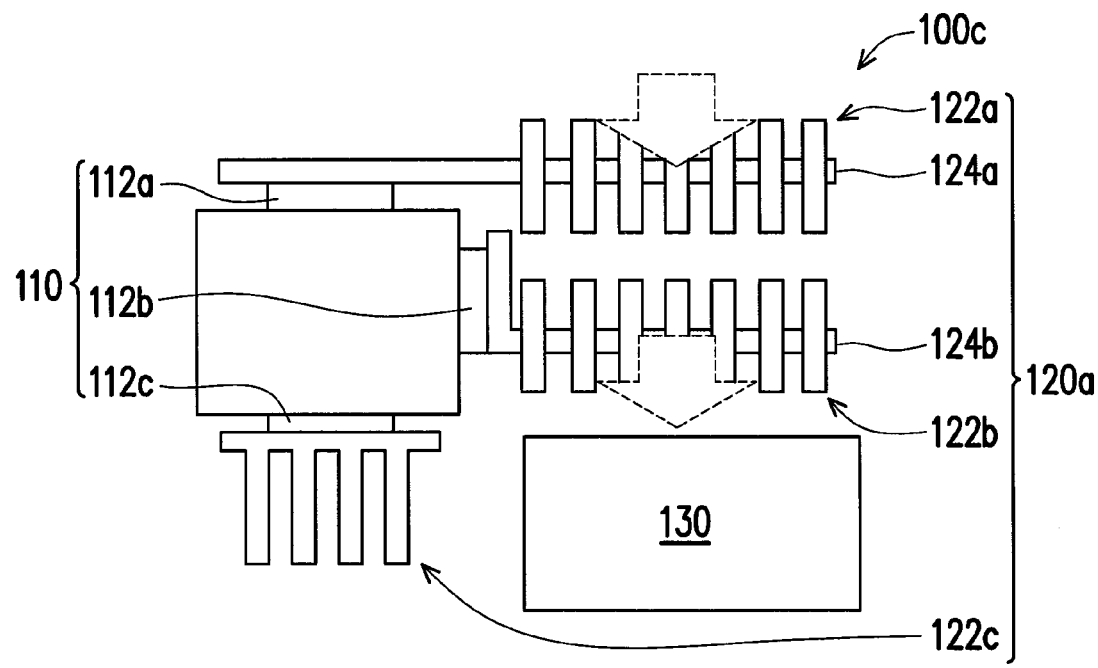
FIG. 6 is a component configuration diagram of an illumination system according to another embodiment of the invention.

Referring to FIG. 6, similar to the illumination system 100a of FIG. 4, positions of the heat sink 122b and the ion fan 130 of the illumination system 100c of the embodiment are exchanged. Similarly, as that shown in FIG. 6, the heat sink 122a thermally coupled to the solid-state light-emitting element 112a is located at the upstream of the forced convection air generated by the ion fan 130, so as to achieve a best cooling effect. Moreover, the heat sink 122b is located at the downstream of the forced convection air generated by the ion fan 130 compared to the heat sink 122a, so as to achieve a better cooling effect.

In summary, in the embodiment of the invention, since the ion fan has no friction loss and oil pollution, it avails prolonging a life time of the illumination system, and the ion fan does not have a magnetic shearing sound of a motor and a wind shearing sound of fan blades, which avails reducing an operation noise of the illumination system. Moreover, the ion fan used in collaboration with the solid-state light source group may be used in a projection apparatus with a smaller height of casing.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, adapted to be used in a projection apparatus, and the illumination system comprising:
    a solid-state light source group;
    a cooling module thermally coupled to the solid-state light source group; and
    an ion fan, wherein the cooling module is located on a path of a forced convection air generated by the ion fan,
    wherein the solid-state light source group comprises a plurality of solid-state light-emitting elements, the cooling module comprises a plurality of heat sinks, the heat sinks are respectively and correspondingly connected to the solid-state light-emitting elements, at least one of the heat sinks is located on the path of the forced convection air generated by the ion fan, the solid-state light-emitting elements comprise a red, a blue, and a green light-emitting diode elements, and only the heat sink thermally coupled to the red light-emitting diode element and the heat sink thermally coupled to the green light-emitting diode element are located on the path of the forced convection air generated by the ion fan, wherein the heat sink thermally coupled to the red light-emitting diode element is located at an upstream of the forced convection air generated by the ion fan compared to the heat sink of the blue and the green light-emitting diode element.

2. The illumination system as claimed in claim 1, wherein the cooling module comprises at least one heat pipe, and at least one of the heat sinks is thermally coupled to the corresponding solid-state light-emitting element through the heat pipe.

3. The illumination system as claimed in claim 1, wherein a forced convection air generation area of the ion fan has a shape of a rectangle.

4. A projection apparatus, comprising:
    a casing;
    an illumination system disposed in the casing and producing an illumination beam;
    a light valve disposed in the casing and converting the illumination beam into an image beam; and
    a lens disposed in the casing and converting the image beam into a projection beam, wherein the illumination system comprises:
a solid-state light source group;
a cooling module thermally coupled to the solid-state light source group; and
an ion fan, wherein the cooling module is located on a path of a forced convection air generated by the ion fan,
wherein the solid-state light source group comprises a plurality of solid-state light-emitting elements, the cooling module comprises a plurality of heat sinks, the heat sinks are thermally connected to the solid-state light-emitting elements respectively, at least one of the heat sinks is located on the path of the forced convection air generated by the ion fan, the solid-state light-emitting elements comprise a red, a blue, and a green light-emitting diode elements, and only the heat sink thermally coupled to the red light-emitting diode element and the heat sink thermally coupled to the green light ting diode element are located on the path of the forced convection air generated by the ion fan, wherein the heat sink thermally coupled to the red light-emitting diode element is located at an upstream of the forced convection air generated by the ion fan compared the heat sink of the green light-emitting diode element.

5. The projection apparatus as claimed in claim 4, wherein the maximum height of the casing is smaller than 5 centimeters.

6. The projection apparatus as claimed in claim 4, wherein the cooling module comprises at least one heat pipe, and at least one of the heat sinks is thermally coupled to the corresponding solid-state light-emitting element through the heat pipe.

7. The projection apparatus as claimed in claim 4, wherein a forced convection air generation area of the ion fan has a shape of a rectangle.

\* \* \* \* \*